United States Patent [19]

Shackelford et al.

[11] Patent Number: 5,237,654
[45] Date of Patent: Aug. 17, 1993

[54] HIERARCHICAL INTER-PANEL PROCESS FLOW CONTROL

[75] Inventors: Floyd W. Shackelford, Buford; Richard E. Moore, Marietta, both of Ga.

[73] Assignee: International Business Machines Corporation, Armonk, N.Y.

[21] Appl. No.: 510,350

[22] Filed: Apr. 17, 1990

[51] Int. Cl.$^5$ .......................... G06F 3/14; G06F 9/445
[52] U.S. Cl. .................................. 395/160; 395/157; 395/650; 395/158
[58] Field of Search ............... 395/160, 157, 158, 159, 395/600 MS, 650 MS, 700 MS; 340/721

[56] References Cited

U.S. PATENT DOCUMENTS

| | | | |
|---|---|---|---|
| 4,688,167 | 8/1987 | Agarwal | 395/650 |
| 4,713,656 | 12/1987 | Cliff et al. | 395/157 X |
| 4,761,642 | 8/1988 | Huntzinger | 395/157 X |
| 4,807,142 | 2/1989 | Agarwal | 395/650 |
| 4,819,189 | 4/1989 | Kikuchi | 395/158 |
| 4,821,211 | 4/1989 | Torres | 395/160 X |
| 4,823,108 | 4/1989 | Pope | 395/157 X |
| 4,829,294 | 5/1989 | Iwami | 395/157 X |
| 4,843,538 | 6/1989 | Lane et al. | 364/188 |
| 4,845,644 | 7/1989 | Anthias et al. | 395/157 |
| 4,862,349 | 8/1989 | Foreman et al. | 395/700 |
| 4,862,389 | 8/1989 | Takagi | 395/156 |
| 4,868,765 | 9/1989 | Diefendorff | 395/157 |
| 4,896,290 | 1/1990 | Rhodes et al. | 395/650 |
| 5,046,001 | 9/1991 | Barker et al. | 395/700 X |
| 5,050,105 | 9/1991 | Peters | 340/721 X |
| 5,072,412 | 12/1991 | Henderson, Jr. et al. | 395/159 |
| 5,121,478 | 6/1992 | Rao | 395/157 |

OTHER PUBLICATIONS

Microsoft Windows User's Guide, Version 2.0, 1987, pp. 31-33, 80-84.
Halpern et al., "Incidence Matrix Sequencing", IBM TDB, vol. 30, No. 2, Jul. 1987, pp. 736-738.

*Primary Examiner*—Gary V. Harkcom
*Assistant Examiner*—Raymond J. Bayerl
*Attorney, Agent, or Firm*—John J. Timar

[57] ABSTRACT

An inter-panel process flow control method and system for enabling an uninhibited change of scope from the active panel to another panel visible on a display screen. The process relies on object-oriented programming constructs, particularly the inheritance property, and the control methods associated with the panel class. A hierarchical internal program logic is implemented where each child panel inherits the control method of its parent panel. An Action Router control method determines if a change of scope request can be handled locally by the currently active panel. The child panels of the currently active panel are queried in a controlled sequence using this inherited control method until a child panel is found that can handle the change of scope request.

12 Claims, 3 Drawing Sheets

HIERARCHICAL INTER-PANEL PROCESS FLOW CONTROL

REFERENCE TO RELATED APPLICATION

This application is related to co-pending patent application, Ser. No. 425,639 filed on Oct. 23, 1989 by R. L. Abraham, et al., entitled "Method and Apparatus for Processing a Complex Hierarchy of Data Objects" and having the same assignee. The co-pending application discloses a system and method for traversing from a first selected data object to a second selected data object within a complex hierarchy of interrelated data objects. The traversals are accomplished by storing the data objects encountered during each traverse along with the set of actions that were necessary to navigate between the selected data objects.

BACKGROUND OF THE INVENTION

The present invention relates, in general, to object-oriented programming systems and, in particular, to a method and system for implementing a hierarchical program and procedure control mechanism in a "messy desk" windowing environment, in which numerous activities take place simultaneously within the same application.

Panels and windows are used interchangeably to refer to an interface component which presents objects and actions to users on a display screen. For example, the multi-tasking capability provided by the OS/2 operating system on the IBM PS/2 computer allows many applications to share the terminal monitor screen through the Presentation Manager component of OS/2. The window (panel) the user is currently interacting with is called the active window (panel).

The primary visual components of the user environment are the screen background, windows (panels), application icons, and a free-moving cursor. The concept of point-and-select is fundamental in a user-controlled interface, i.e., the user moves the cursor to a point that is visible anywhere on the screen and then selects it. A change of scope occurs when the cursor is moved beyond the range of the currently selected panel or window. In a messy desk windowing environment, a user can change scope from panel to panel in an apparently arbitrary and unpredictable manner. Selecting another panel brings it into the foreground and makes it active. Transparent to the user is the underlying control mechanism which results in the new panel choice being made the active panel. Internal program logic is needed to control this apparently unstructured procedural flow. Many messy desk windowing applications utilize a single master approach in which there is kept a single master list of all panels on the screen. The application must then be sufficiently knowledgeable with respect to the particular characteristics of each panel to decide which to select. Alternatively, the application would have to query each panel until it found one willing to accept the user input. This approach requires that the list of panels be traversed half-way on average for each change of scope command. Unlike this traditional linked-list approach, this invention provides a process that implements a hierarchical program and procedure control while simultaneously supporting a completely uninhibited change of scope.

In the prior art, examples of linked-list representations of panels can be found in IBM Technical Disclosure Bulletin, Volume 30, No. 2, July 1987 at pages 736-738, and in U.S. Pat. No. 4,845,644 issued to Anthias, et al. In the cited IBM Technical Disclosure bulletin, panels are displayed according to a path sequence referenced from the ordering. An incidence matrix is used at panel creation time to specify the paths among the panels, thereby eliminating the need to program logical constructs within the application program. Anthias et al. disclose a method for altering the priority display of panels, but essentially rely on a last used ordering scheme.

With the increasing complexity of computer-based systems, object oriented programming has received increased attention and investigation. In object oriented programming systems, the primary focus is on data rather than functions. An object is a data structure and a set of operations or functions that can access the data structure. The data structure can be represented by a frame containing a number of slots with each slot containing an attribute of the data. Each attribute may be a primitive (i.e., an integer or a string) or an object reference, that points to another object's instance or instances. Each operation (function) that can access the data structure is called a method. Each defined object is usually manifested in a number of instances, with each instance containing the particular data structure for a particular example of the object. The primary characteristics of object-oriented programming systems are encapsulation and inheritance. A frame is encapsulated by its methods, which means all access to the data structure is handled by the surrounding methods, thus providing data independence. The inheritance property allows previously written programs to be broadened by creating new superclasses and subclasses of objects. Each subclass inherits the frame and methods of its superclass.

Object oriented programming systems typically implement a messy desk environment in which numerous activities take place simultaneously within the same application. In an object oriented computer system, work is accomplished by sending action request messages to an object which contains (encapsulates) data. The object will perform the requested action on the data according to its predefined methods. An object's class defines the types and meanings of the data and the action requests (messages) that the object will honor. The individual objects containing data are called instances of the class. The programs performing the requested actions are called methods of the class.

Object classes can be defined to be subclasses of other classes. Subclasses inherit all the data characteristics and methods of the parent class. Subclasses can add additional data and methods and can redefine any data elements or methods of the parent class. A message is handled using the data in the object instance and the method in its class or its parent class, as long as the target object either defines a method to handle the message or has a parent class that defines such a method.

The inheritance property of object oriented programming systems is relied upon in the present invention to enable a systematic hierarchical inter-panel process control mechanism.

SUMMARY OF THE INVENTION

It is therefore an object of this invention to provide a method for inter-panel process flow control that uses a hierarchical centralized control manager for handling user requests to switch from one application panel to another.

It is another object of this invention to provide a method for inter-panel process flow control that utilizes the inheritance property of object oriented programming systems.

It is a further object of this invention to provide a centralized system for inter-panel process flow control that relies on the hierarchical relationship between panels.

These and other objects and advantages are accomplished by this invention in which the centralized control manager procedure accepts a user initiated command which is defined as an event and determines if the currently active panel can handle the command. Each keyboard or mouse interaction made with the paneled applications by the user represents an event. There is a defined list of events that can be handled by each panel. This collection of events represents a particular panel's scope, i.e., the user initiated requests to which the particular panel can respond. If the event cannot be handled by the active panel, the event is said to represent a change of scope or to be outside the scope of the active panel. Most important to this invention is the user selection of another application panel which occurs when the user by keyboard input, movement and clicking of the mouse, or by touchscreen input, selects another displayed panel to become the active application panel. When the active panel receives an instruction outside its scope, the instruction is either handled transparently by its child panels or is passed back to its parent panel for handling. In most cases, a sub-tree of the entire tree of panels is executed for each change of scope request. The actual sequence of navigation between panels starts from one of the immediate child panels of the current active panel. If this first child panel cannot handle the requested event, then one of its child panels is tested. This process continues down this hierarchical path emanating from the current active panel until a leaf panel is found, that is, a panel in the path that has no successor panels. Each hierarchical path between the panels is followed in this manner until the panel is found that can handle the user initiated event. If no child panel is found that can handle the user request, the request is passed up to the parent panel of the current active panel and processing continues.

The foregoing features and advantages of the invention will be more fully described below in conjunction with the accompanying drawings.

DETAILED DESCRIPTION OF THE PREFERRED EMBODIMENTS

Figure 1:
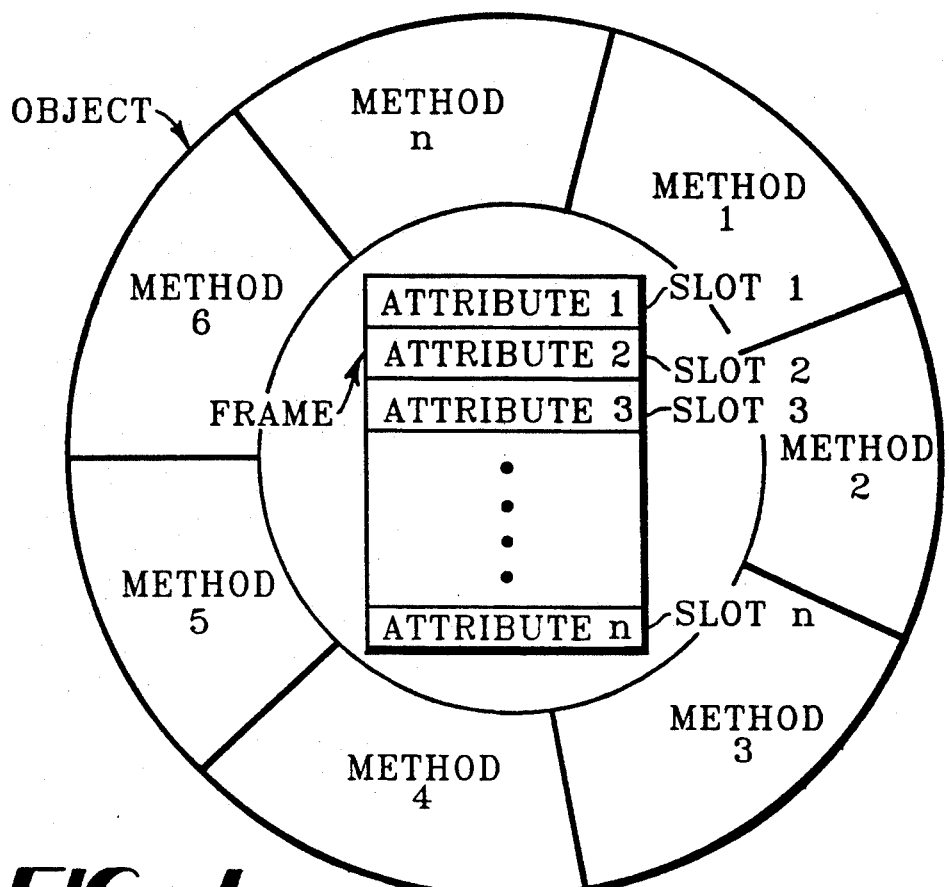
FIG. 1 illustrates a schematic relationship of an object.

The preferred embodiment of this invention will be described in the context of an object-oriented environment. Accordingly, the first three figures provide representations of a generalized object class, an example of an object class, and the inheritance property of objects respectively. Specifically, FIG. 1 illustrates a schematic representation of an object in which a frame is encapsulated within its methods.

Figure 2:
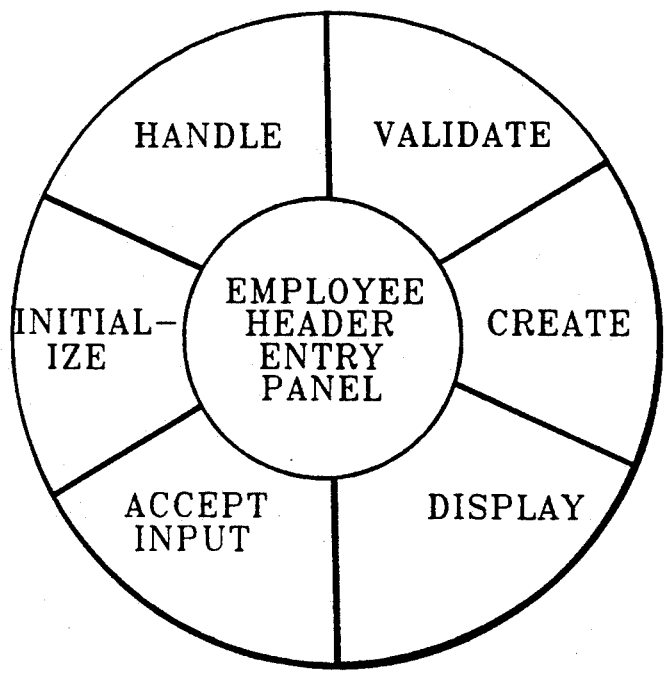
FIG. 2 illustrates a schematic relationship of an example of an object.

FIG. 2 illustrates an object class referred to as Employee Header Data Entry Panel which is shown surrounded by a number of programs. These programs include an accept input function, a create function, an initialize function, a validate function, a handle function, and a display function. The create function allows a new instance of object class employee to be created; the accept input function allows an object to accept data from a keyboard or mouse device input; the validate function performs checking on the data contained in the new instance of the object class employee, etc.

Figure 3:
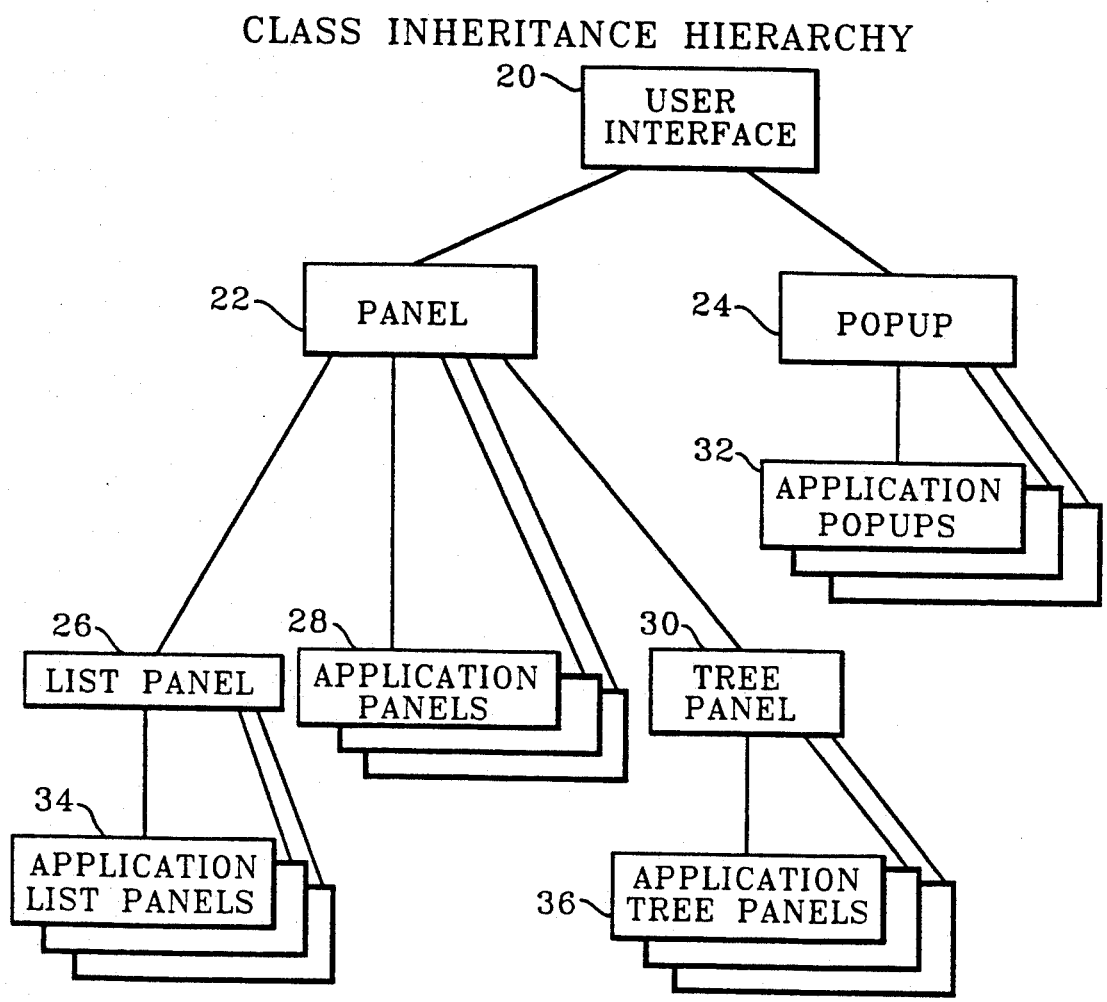
FIG. 3 illustrates the class inheritance hierarchy of a user interface object.

FIG. 3 illustrates the class inheritance hierarchy for the object class User Interface. This object class has the attribute List of Children and defines the methods Action Router and Accept Input which are inherited by all subclasses. The Action Router method determines whether or not an action request can be handled by an object class. The Accept Input method enables an object class to accept user input from an attached input device. The User Interface object 20 has two subclasses in the illustration: the Panel subclass 22 and the Popup subclass 24. Messages are handled by these subclasses using the methods inherited from the User Interface class. Subordinate to the Panel class 22 are the List Panel subclass 26, the Tree Panel subclass 30, Application List Panels 34, Application Tree Panels 36, and Application Panels 28. Subordinate to the Popup class 24 are Application Popups 32. Each of the aforementioned subclasses inherits the Accept Input and Action Router methods. Also relevant to this invention is the Handle method. The interface to the Handle method is defined in User Interface class 20; however, implementation of the body of the method is deferred to each child class.

Figure 4:
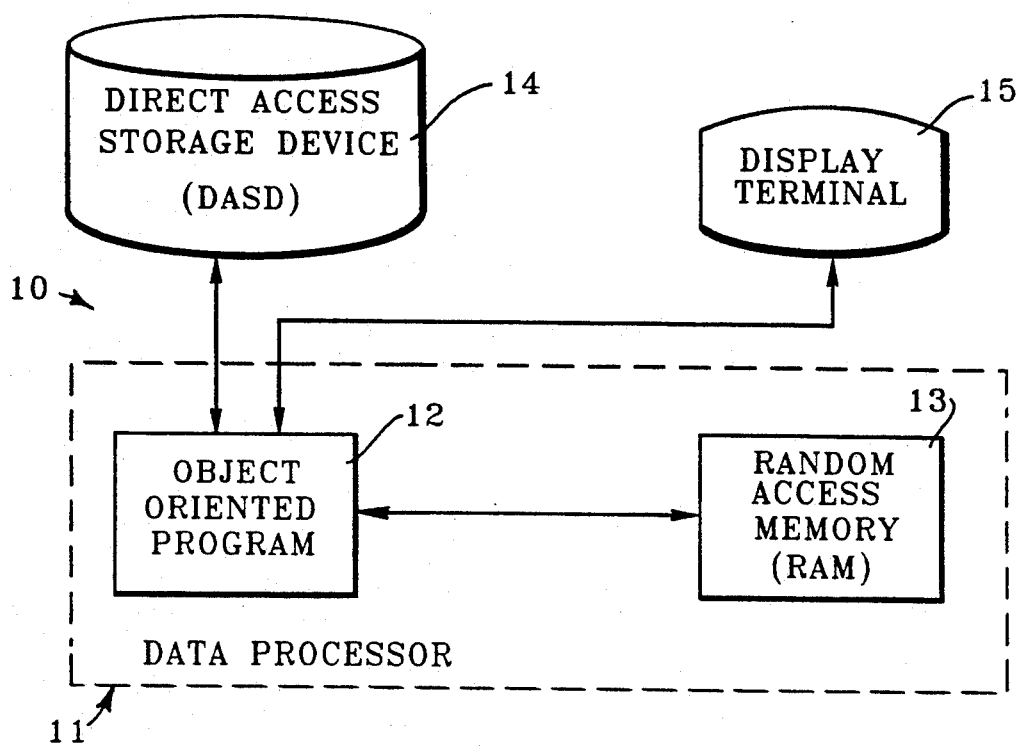
FIG. 4 illustrates a schematic block diagram of an object oriented computer system for implementing the present invention.

FIG. 4 illustrates a schematic block diagram representing the implementation of an object oriented computer system 10. It includes a data processor 11 for executing the procedures associated with each object, a random access memory (RAM) 13 for providing a working store for active data and intermediate results, a direct access storage device for permanent data storage, and a display terminal 15 which presents one or more panels associated with each application program.

An object oriented program 12 typically includes a table for the methods associated with each object. This method table contains the method number and the corresponding address where the method is located. An object identification table is usually included for each object containing all instances of the object and the corresponding address or object reference (OREF) for each instance. These tables are used in processing for executing the methods and for accessing objects as well as data instances of objects. More detailed discussions of object-oriented programming systems are provided in two co-pending patent applications having the same assignee. These are patent applications, Ser. No. 425,607 filed on Oct. 23, 1989 by R. L. Abraham, et al., entitled "Unit of Work for Preserving Data Integrity of a Database" and Ser. No 010,441 filed on Jan. 22, 1993 by R. L. Abraham, et al., entitled "Slot Objects for an Object-Oriented Programming System". The contents of these applications are incorporated by reference herein.

It is desirable, in object-oriented programming systems, to process a number of tasks independently and in parallel without having one task impact another. In a "messy desk" environment, there are numerous concurrent activities within the same application.

Figure 5:
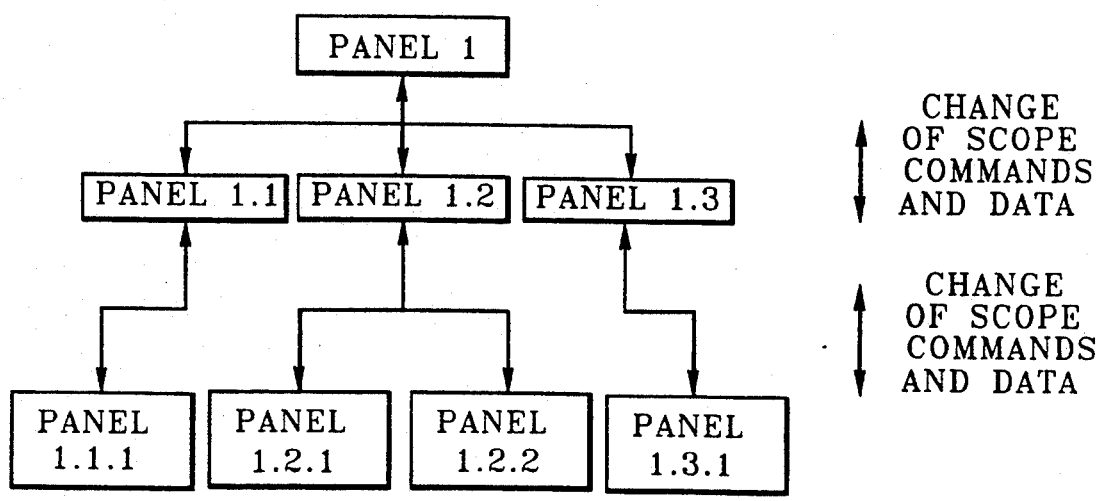
FIG. 5 illustrates the hierarchical relationship between a panel and its child panels.

FIG. 5 illustrates the hierarchical relationship between a panel and its child panels. Panel 1 can be the system presentation manager panel or any active subpanel. Panel 1 has three child panels in the illustration, i.e., Panel 1.1, Panel 1.2 and Panel 1.3. Panel 1.1.1 is a child panel of Panel 1.1; Panels 1.2.1 and 1.2.2 are child panels of Panel 1.2; Panel 1.3.1 is a child panel of Panel 1.3.1. Shown on the right side of the figure are arrows indicating that change of scope commands (i.e., events that cannot be handled by a particular panel) and data flow from panel to panel in a hierarchical fashion. To illustrate the hierarchical process, it is assumed that at a certain time, Panel 1.2 is the active panel and the user selects Panel 1 by dragging the mouse or screen cursor from its position on Panel 1.2 to a point within the visible region of Panel 1. In the underlying control process, when Panel 1.2 receives a change of scope command for an event that it cannot handle, it passes the change of scope information to child Panel 1.2.1. In this case, Panel 1.2.1 does not have a child panel that can be sent the change of scope command; therefore, it returns to its parent panel with the scope command and data unchanged. Panel 1.2 next sends the change of scope command to its other child panel. Panel 1.2.2 responds in the same way as Panel 1.2.1. At this point, Panel 1.2 returns to its parent (Panel 1) with the change of scope command and data. Since Panel 1 can handle the change of scope command, it becomes the active panel.

In implementing this hierarchical control mechanism, each panel maintains a list of all its active child panels and contains an inherited centralized control manager routine which (1) accepts a scope command and data as input parameters, (2) handles the scope action itself if possible, (3) asks each child panel, in turn, to handle the scope command if it can't, and (4) returns either the change of scope command or a new action to its caller. A panel is able to handle the scope action itself if its panel identification equals the change to panel identification of the change of scope command. The panel then becomes the active panel and processes user actions against itself until another change of scope is detected. The active panel then continues the above four step control loop process by repeating step (2). The first step of accepting a scope command and data as input parameters only occurs when entering an inactive panel's centralized control manager routine. This routine is referred to subsequently as the Action Router method. An active panel traps all user actions, including the change of scope command as part of its normal processing logic. In order for a panel to become active, one of the following must have occurred:

1. A parent panel created the panel and handed over control to it;
2. the user changed scope to the panel; or
3. a child panel finished its processing and returned to the parent panel.

The panel flow process is implemented utilizing the object oriented class hierarchy structure. The Panel class has the attribute of child panels, which is a linked list of all the child panels of the current panel. In this case, child panels do not refer to the inheritance property, but instead to the secondary panels that emanate from a primary panel. Each panel that inherits from the Panel class inherits this list attribute.

The Panel class has three methods associated with it and pseudocode for each method is provided in the Appendix. The Action Router method is the centralized control manager routine that accepts a change of scope command and determines if it can be handled by the panel itself, or by a child panel, or whether the change of scope command should be passed back to the panel's parent. This is the central component of the hierarchical process flow. Since a panel is only concerned with the list of events that it can handle, actions outside its scope are either handled transparently by its children or passed back up to its parent. Each panel which inherits from the Panel class inherits the Action Router method. The Handle method handles commands relevant to the current panel. It is deferred from the Panel class so that each panel defines its own Handle method. The third method is the Accept Input method which enables a panel to accept input from the keyboard or an attached input device such as a mouse. With reference again to FIG. 3, the key concepts in this invention are that the Action Router and Accept Input methods are defined once in the User Interface 20 and then inherited by all child panels of the User Interface. The Handle method is redefined by each child panel of User Interface 20 when the Handle method of a specific child panel is invoked from the Action Router.

The interaction of the panel object class with the method associated with it will be discussed in the context of the hierarchical panel layout contained in FIG. 5. As a starting point, consider Panel 1.2 as being the active panel. This means that Panel 1.2 is in the Accept Input method waiting for user input. When the user selects another panel, for example Panel 1, by dragging the cursor from the non-overlapped region of Panel 1.2 to the non-overlapped region of Panel 1 and clicking the mouse button, an event is generated which indicates a change of scope. Panel 1.2 returns from the Accept Input method back to its Action Router method. The Accept Input method returns a change of scope event. The Action Router method of Panel 1.2 sends a request to the Handle method of Panel 1.2 to handle the event. However, the Handle method of Panel 1.2 decides that the scope change is outside the list of events that can be handled by the panel. The Handle method returns to the Action Router method of Panel 1.2 which then passes the change of scope information to Panel 1.2.1 by executing the Action Router method of Panel 1.2.1. In actuality, the Action Router method of Panel 1.2.1 is exactly the same as the Action Router method of Panel 1.2, which was inherited by the panel from the Panel parent class. The Action Router method of Panel 1.2.1 requests the Handle method of Panel 1.2.1 to handle the change of scope event. Since the Handle method of Panel 1.2.1 could not handle the event, it returns control to the Action Router method of Panel 1.2.1. The Action Router method of Panel 1.2.1 next determines that Panel 1.2.1 does not have a child panel to which it can send the change of event scope; therefore, it returns control to the Action Router method of its parent, Panel 1.2, with the scope event unchanged.

At this point, Panel 1.2 continues testing its other child panels by sending the change of scope event to the Action Router method of Panel 1.2.2. In turn, the Action Router method of Panel 1.2.2 requests the Handle method of Panel 1.2.2 to handle the change of scope event. Since the event is outside the scope of Panel 1.2.2, the Handle method returns control to the Action Router method of Panel 1.2.2. The Action Router method of Panel 1.2.2 determines that this panel does not have any child panels, so the change of scope event is sent back to the parent, Panel 1.2, with the scope event unchanged by returning control to Panel 1.2.

The Action Router method of Panel 1.2 determines that there are no other child panels to which it can send the change of scope event; therefore, since the event could not be handled, control is returned to its parent, Panel 1, with the change of scope event. The Action Router method of Panel 1 receives control from the Action Router method of its child, Panel 1.2. The Action Router method of Panel 1 requests the Handle method of Panel 1 to handle the change of scope event. Finally, the Handle method determines that it can handle the change of scope event and sends an affirmative response to the Action Router method of Panel 1. The Action Router method of Panel 1 then calls the Accept Input method of Panel 1 to wait for the next user event to be input.

APPENDIX

I. Action Router

```
procedure action_router (
   event : in out EVENT_TYPE;
   did_i_do_it : in out BOOLEAN)
   <* (* route control *) *> is
   end_of_list : BOOLEAN;
begin
   -- LOGIC
   loop
      did_i_do_it := FALSE;
      <* (* call my panel handle routine to process the action *)
          *> is
      begin
         SELF.handle ( event, did_i_do_it);
      end;
      <* (* if my panel handle routine could do it, then wait for
          the next user response; otherwise, let me ask each of
          my children if they can process the event *) *> is
      begin
         if
            (did_i_do_it = TRUE)
         then
            SELF.Accept_Input ( event );
         else
            if
               (children.nb_elements>0)
               --* make sure there is at least one child panel to
                   ask!
            then
               end_of_list := FALSE;
               <* (* position to the first child panel in the
                   linked list *) *> is
               begin
                  children.move_to_first;
               end;
               while
                  ( ( did_i_do_it = FALSE)
                   and
                   ( end_of_list = FALSE))
               loop
                  <* (* ask this child if it can handle the event
                      *) *> is
                  begin
                     children.current_value.action_router
                        ( event, did_i_do_it );
                  end;
                  <* (* if this child could not do it, go on to
                      the next child in the list *) *> is
                  begin
                     if
                        (did_i_do_it = FALSE)
                     then
                        children.move_to_next ( end_of_list );
                     end if;
                  end;
               end loop;
```

APPENDIX-continued

```
            end if;
         end if;
      end;
      <* (* if this panel can't handle the event, and none
          of this panel's children can handle the event,
          toss the event back up to this panel's parent
          panel *) *> is
      begin
         exit when ( did_i_do_it = FALSE );
      end;
   end loop;
end action_router;
```

II. Handle

```
procedure handle (
   event_in : in EVENT_TYPE;
   did_I_do_it : in out BOOLEAN)
   <* (* Handle the command. *) *> is
begin
   --LOGIC
   <* (* set flag to false, assuming that the event cannot be
       handled here *) *> is
   begin
      did_i_do_it := FALSE;
   end;
   <* (* check the incoming event against all the events this
       panel knows how to handle *) *> is
   begin
      if
         (event_in = "change to this panel's scope")
      then
         did_i_do_it := TRUE;
         SELF.change_to_this_panels_scope;
      elsif
         (event_in = "event_1")
      then
         did_i_do_it := TRUE;
         SELF.do_event_1;
      elsif
         (event_in = "event_2")
      then
         did_i_do_it := TRUE;
         SELF.do_event_2;
      end if;
   end;
end handle;
```

III. Accept Input

```
procedure accept_input (
   event_out : out EVENT_TYPE)
   <* (* wait for a user initiated event *) *> is
begin
   --LOGIC
   <* (* wait for and receive a user event; store it in
       event_out *) *>;
end accept_input ;
```

While the invention has been particularly shown and described with reference to the particular embodiment thereof, it will be understood by those skilled in the art that various changes in form and details may be made therein without departing from the spirit and scope of the invention. Specifically, although the invention has been described in an embodiment operating within an object-oriented environment, the methods described are applicable to any multitasking computer system that implements the windowing display of applications running concurrently.

Having thus described out invention, what we claim and desire to secure by Letters Patent is as follows:

1. In an information processing system having a central data processor, a random access memory, a direct access storage device, a display terminal, and an input device, a method for processing the change of scope commands made by a user in an object-oriented environment wherein a plurality of panels are displayed on said display terminal with one panel currently active, each of said plurality of panels having a panel class associated with it, said method comprising the steps of:

maintaining a list in hierarchical relationship of all child panels for each panel in said plurality of displayed panels;

initiating a change of scope command by selecting one of said plurality of displayed panels to become the next active panel;

determining if the change of scope command can be handled by the panel class associated with the current active panel;

if the change of scope command cannot be handled by said panel class associated with said current active panel, searching in a hierarchical sequence for a child panel whose associated panel class can handle the change of scope command;

if the change of scope command cannot be handled by the panel class associated with any child panel of said current active panel, passing the change of scope command to the panel class associated with the parent panel of said current active panel for further processing; and if a panel is found whose associated panel class can handle the change of scope command, designating the panel found as the new active panel by bringing it to the foreground on said display terminal.

2. The method of claim 1 wherein the step of selecting the next active panel includes using a mouse input device to drag a screen cursor on the display terminal from the current active panel to the visible region of a displayed panel that is to become the next active panel.

3. The method of claim 1 wherein said searching in said hierarchical sequence follows the hierarchical relationship of all child panels proceeding from the current active panel down each branch emanating from said current active panel in succession until each branch has been fully searched unless a child panel is found whose panel class can handle the change of scope command.

4. The method of claim 1 wherein the panel class for each of said plurality of displayed panels contains a panel identification tag and each change of scope command contains a change to panel identification stage and the step of searching for a child panel that can handle the change of scope command further includes comparing the panel identification tag of each chile panel tested with the change to panel identification tag to determine if there is a match.

5. The method of claim 1 wherein the step of searching in a hierarchical sequence further includes:

determining if the change of scope command can be handled by the panel class associated with the parent panel receiving the change of scope command for further processing;

if the panel class associated with said parent panel cannot handle the change of scope command, querying the panel class associated with each child panel of said parent panel that had not been queries previously to determine if the panel class associated with said each child panel can handle the change of scope command;

if the change of scope command cannot be handled by the panel class associated with any child panel of said parent panel, passing the change of scope command to the panel class associated with a parent panel at the next higher level in said hierarchical relationship.

6. A system for processing change of scope commands made by a user in an object-oriented environment running on an information processing system having a central data processor, a random access memory, a direct access storage device, a display terminal, and an input device wherein a plurality of panels are displayed on the display terminal and one panel is the current active panel, said system comprising:

means for chaining together the displayed panels in a hierarchical relationship and establishing their ordered sequence for investigation;

first logic means for enabling a panel class associated with each of the plurality of displayed panels to accept change of scope commands from the input device;

second logic means cooperative with said means for chaining for controlling the routing of change of scope commands to the panel class associated with each inactive panel in a hierarchical sequence which follows a hierarchical parent to child relationship among the displayed panels first proceeding down each branch emanating from the current active panel until all of said branches are exhausted and then advanced up to the parent panel of the current active panel;

third logic means for determining if the change of scope command can be handled by the panel class associated with the current active panel, and if it cannot be handled, for determining if the change of scope command can be handled by the panel class associated with any inactive panel to which it is routed by said second logic means and sending an affirmative response to said second logic means when the panel class associated with the inactive panel that can handle the change of scope command is found.

7. The system of claim 8 wherein the means for chaining is a random access memory storing a plurality of linked list data structures.

8. The system of claim 6 wherein the input device used to generate change of scope commands is a mouse that controls the position of a screen cursor on the display terminal.

9. The system of claim 6 wherein said first logic means, said second logic means, and said third logic means contain control methods that encapsulate an object-oriented class identified as parent class and which are inherited by each child panel from its parent panel in the hierarchical relationship among the displayed panels.

10. A method for processing user requests for changes to the currently active panel in an interactive information processing system in which a plurality of panels are displayed on a display screen and represent software applications that can be selected for processing by the user, said method comprising:

maintaining a list of said plurality of panels in a hierarchical parent-child relationship;

selecting one of said plurality of panels to become a next active panel;

commencing with the testing of a panel class associated with said currently to determine if the panel class associated with the selected next active panel has been found, and if not active panel, proceeding down each branch of said list of panels in hierarchical parent-child relationship and testing the panel class associated with each panel encountered to determine if the panel class associated with the selected next active panel has been found;

if the panel class associated with said selected next active panel is not found, returning to the parent panel of said active panel and continuing the search by next testing the panel class associated with the parent panel, and if the panel class associated with said selected next active panel is not found, then proceeding down each previously untested branch of panels descending from said parent panel and testing each panel encountered; and when the panel class associated with said selected next active panel is found, terminating said testing and bringing the selected next active panel to the foreground on said display screen.

11. The method of claim 10 wherein said step of selecting one of said plurality of panels includes using a mouse input device to drag a display screen cursor from the currently active panel to said next active panel.

12. The method of claim 10 wherein the step of testing the panel class associated with each panel encountered includes comparing a unique panel identifier associated with the panel class for each of said plurality of panels with a unique change to panel identifier associated with each user request and indicating if there is a match.

* * * * *